United States Patent
Page et al.

(10) Patent No.: US 12,160,140 B2
(45) Date of Patent: Dec. 3, 2024

(54) OUTER ROTOR MACHINE WITH BANDING SLEEVE

(71) Applicant: Hamilton Sundstrand Corporation, Charlotte, NC (US)

(72) Inventors: Andrew Page, Tring (GB); Savvas Georgiou, Middlesex (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 120 days.

(21) Appl. No.: 17/566,017

(22) Filed: Dec. 30, 2021

(65) Prior Publication Data

US 2022/0209601 A1    Jun. 30, 2022

(30) Foreign Application Priority Data

Dec. 31, 2020 (EP) .................................. 20218004

(51) Int. Cl.
*H02K 1/30* (2006.01)
*H02K 21/22* (2006.01)

(52) U.S. Cl.
CPC ............... *H02K 1/30* (2013.01); *H02K 21/22* (2013.01)

(58) Field of Classification Search
CPC ......... H02K 1/2791; H02K 1/30; H02K 21/22
See application file for complete search history.

(56) References Cited

U.S. PATENT DOCUMENTS

| | | | |
|---|---|---|---|
| 5,457,870 A | 10/1995 | Canders | |
| 8,421,297 B2 | 4/2013 | Stout et al. | |
| 9,203,279 B2 | 12/2015 | Mcmullen | |
| 9,641,030 B2 | 5/2017 | Bettoni | |
| 10,439,456 B2 | 10/2019 | Reddy et al. | |
| 2008/0088195 A1* | 4/2008 | Dooley | H02K 1/2791 310/67 R |
| 2009/0202353 A1* | 8/2009 | Martensson | F04D 29/326 416/190 |
| 2013/0113324 A1 | 5/2013 | Shepard | |
| 2015/0171685 A1 | 6/2015 | Giddings et al. | |
| 2018/0083495 A1 | 3/2018 | Beckman et al. | |

(Continued)

FOREIGN PATENT DOCUMENTS

| | | | | |
|---|---|---|---|---|
| CN | 102842977 A | * | 12/2012 | ............... H02K 1/30 |
| JP | 2016504220 A | * | 2/2016 | |

(Continued)

OTHER PUBLICATIONS

CN-102842977-A, Arimatsu et al., all pages (Year: 2012).*

(Continued)

*Primary Examiner* — Naishadh N Desai

(74) *Attorney, Agent, or Firm* — CANTOR COLBURN LLP

(57) ABSTRACT

An electric motor/generator includes a stator, a rotor with a plurality of magnets and a rotor frame arranged to support the plurality of magnets in an outer rotor configuration so that the plurality of magnets are arranged to form an annular ring surrounding the stator. The electric motor/generator also includes a banding sleeve disposed on a circumferential portion of the rotor frame radially outwardly of the plurality of magnets. The banding sleeve may comprise a composite material such as a carbon fibre composite.

20 Claims, 6 Drawing Sheets

(56) References Cited

U.S. PATENT DOCUMENTS

2020/0036247 A1    1/2020  Saban

FOREIGN PATENT DOCUMENTS

WO       WO-9423486 A1 * 10/1994    ............. H02K 19/28
WO     WO-2019116713 A1 *  6/2019

OTHER PUBLICATIONS

WO-9423486-A1, Hernden, all pages (Year: 1994).*
WO-2019116713-A1, Ogura et al., all pages (Year: 2019).*
JP-2016504220-A, all pages (Year: 2016).*
European Search Report for application EP 20218004.8, dated May 27, 2021, 7 pages.

* cited by examiner

OUTER ROTOR MACHINE WITH BANDING SLEEVE

FOREIGN PRIORITY

This application claims priority to European Patent Application No. 20218004.8 filed Dec. 31, 2020, the entire contents of which is incorporated herein by reference.

FIELD

The present disclosure relates to an electric motor/generator, as well as a method of increasing the power density of an electric motor/generator. The electric motor/generator may be a high power electric motor/generator and used for high power applications such as aircrafts.

BACKGROUND

An outer rotor machine is one where the rotor spins around the stationary core of the machine (motor/generator), as opposed to the more normal inner rotor machine where the rotor spins inside the stationary core. During operation of an outer rotor motor/generator, the rotor frame will be subjected to centrifugal loads as the rotor rotates. The centrifugal loads generate hoop stress within the rotor frame which leads to deflection of the material of the rotor frame. Rotor frames are typically made from steel and in order to reduce the deflection in the rotor frame, the frame may be constructed using thicker sections of steel. However this increases the passive mass of the rotor and hence reduces the efficiency of the motor/generator. Due to the positioning of the passive mass, this can also impact on the rotational inertia adversely. It is important to increase the efficiency of motor/generators due to environmental and cost efficiency purposes. There remains a need to increase the power density of motor/generators so that higher power can be achieved from smaller and/or lighter motor/generators.

SUMMARY

According to a first aspect, the present disclosure can be seen to provide an electric machine in the form of an electric motor or electric generator comprising: a stator; a rotor, comprising a plurality of magnets and a rotor frame arranged to support the plurality of magnets in an outer rotor configuration so that the plurality of magnets are arranged to form an annular ring surrounding the stator; and a banding sleeve disposed on a circumferential portion of the rotor frame radially outwardly of the plurality of magnets.

The banding sleeve may have a higher hoop stress resistance and/or a lower density than the circumferential portion of the rotor frame.

The banding sleeve may be composed of a composite material. Optionally it may comprise continuous fibres laid to extend in at least a hoop direction of the banding sleeve.

The composite material may comprise carbon fibres and a resin matrix. Optionally the resin matrix may comprise an epoxy resin matrix.

The banding sleeve may be disposed on the outer diameter of the circumferential portion of the rotor frame. The banding sleeve may be disposed in a recess in the circumferential portion of the rotor frame.

The circumferential portion of the rotor frame may be cantilevered from a radial portion or the rotor frame. The circumferential portion may hence define a supported end and a distal end.

The rotor frame may comprise aluminium and/or titanium based materials.

The axial centreline of the banding sleeve may be disposed axially offset from the axial centreline of the circumferential portion of the rotor frame. The banding sleeve may be disposed closer to a distal end of the circumferential portion of the rotor frame than a supported end.

The radial thickness of the banding sleeve may vary along an axial length of the banding sleeve and/or a circumference of the banding sleeve. This is in order to provide additional strength to regions where higher loads are generated during use.

The banding sleeve may be applied in order to achieve a substantially symmetrical deflection pattern about an axial centre line of the circumferential portion of the rotor frame when the rotor is in use.

A majority of the fibres of the composite may be wound in a circumferential direction of the banding sleeve. More than 80% of the fibres may be wound in the circumferential direction of the banding sleeve.

The electric motor/generator may be for powering an aircraft. Additionally or alternatively a diameter of the rotor frame of the rotor may be equal to or greater than 200 mm.

According to a second aspect, the present disclosure provides a method of increasing power density of an electric machine such as an electric motor or electric generator, the electric motor/generator comprising a stator and a rotor arranged radially outwardly of the stator, the rotor comprising a plurality of magnets arranged in an annular configuration surrounding the stator and supported by a rotor frame, the method comprising: disposing a banding sleeve on a circumferential portion of the rotor frame radially outwardly of the plurality of magnets.

The banding sleeve may be made from a material selected to have a higher hoop stress resistance and/or a lower density than the circumferential portion of the rotor frame, and optionally wherein the banding sleeve is disposed in a recess in the circumferential portion of the rotor frame.

The banding sleeve may be formed in situ via filament winding and resin impregnation and curing. Alternatively the banding sleeve may be preformed and then pressed in place on the circumferential portion of the rotor frame.

BRIEF DESCRIPTION OF THE FIGURES

Certain embodiments of the present disclosure will now be described in greater detail and by way of example only, with reference to the accompanying drawings, in which.

DETAILED DESCRIPTION

Figure 1:
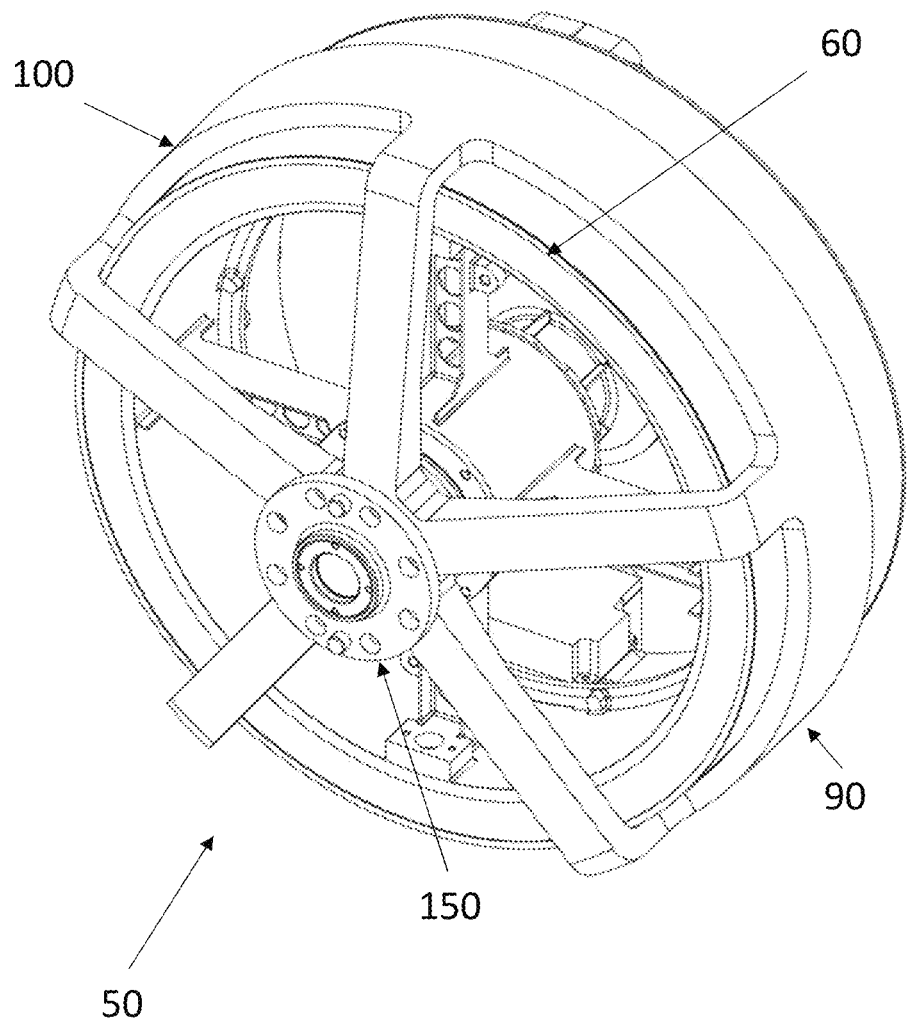
FIG. 1 illustrates a perspective view of an exemplary motor comprising a rotor frame.

There is a need to increase the power density (kW/kg) of motor/generators, i.e., to increase their power output and reduce their weight, so that the applicability of their use can be extended to higher power settings and/or so that smaller weight requirements can be met without compromising power output. One way to achieve a higher power is to use an outer rotor configuration. The magnets are arranged in an annular configuration so as to surround the rotor in a circumferential arrangement as an annular ring of magnets. In an outer rotor configuration, the radius of the rotor frame and the radial position of the magnets is increased as compared to the radius in an inner rotor motor of the same power consumption. With the magnets spaced further from the centre of rotation a greater magnetic torque, and therefore a higher power output, can be achieved for the same rotational speed compared to an inner rotor configuration. However, the outer rotor design requires a rotor frame having a greater mass than in an inner rotor design resulting, in an increased passive mass of the motor/generator, and particularly a greater mass in portions of the rotor frame that are spaced outwardly from the axis of rotation leading to higher rotational inertia.

The mass of electric machines can be divided into two classes: active mass and passive mass. Active mass consists of all electromagnetically active components such as the core, windings, and rotor magnets. Passive mass makes up the remainder of the components in the machine. In addition, the position of the active and passive mass influences the rotational inertia (rotational mass) based on the square of the distance from the axis of rotation, and a larger rotational inertia may limit an electric machine's ability to alter rotational speed quickly and efficiently. In high performance electric machines, power density is a critical consideration. One way to improve power density is to reduce the passive mass of the machine by the use of light-weight materials.

Another issue arising from the use of an outer rotor configuration is deflection of the rotor frame material caused by higher centrifugal loads generated in the larger rotor frame compared to the inner rotor configuration. If the rotor frame is only supported at one end of its length, i.e., if it is a cantilevered configuration which is typical for outer rotor motors, the free end in particular will tend to deflect outwards as a result of the centrifugal loads. To reduce this effect additional structure is required to increase the strength of the areas, thus increasing the passive mass of the rotor further, particularly in a circumferential portion of the rotor frame.

According to the present disclosure an electric machine in the form of an electric motor or an electric generator comprising a stator and a rotor is provided. The rotor comprises a plurality of magnets and a rotor frame arranged to support the plurality of magnets in an outer rotor configuration. In this way, the plurality of magnets are arranged to form an annular ring surrounding the stator. The rotor also comprises a banding sleeve disposed on a circumferential portion of the rotor frame radially outwardly of the plurality of magnets.

Thus, one way to reduce deflection, which has been developed by the inventors, is to apply a banding sleeve to the circumferential portion of the rotor frame. A banding sleeve is a circumferentially extending, band of material, formed as a sleeve, which is able to carry and provide resistance to hoop stresses present in the rotor, in particular in the circumferential portion of the rotor which retains the annular ring of magnets.

In order to reduce the deflection whilst limiting the detrimental effect to the passive mass, a lightweight material for the banding sleeve (e.g., lighter weight as compared to the material of the circumferential portion of the rotor frame) may be used. Ideally the lightweight material has a high hoop stress resistance and a low density, e.g., a higher hoop stress resistance and a lower density than the material of the circumferential portion of the rotor frame.

In order to simultaneously reduce the passive mass of the rotor frame and provide increased resistance to deflection, a part of the rotor frame can be replaced by the banding sleeve. That is to say a radial thickness of the circumferential portion of the rotor frame can be reduced with the banding sleeve compensating for or improving the hoop stress resistance.

In one embodiment, a recess (e.g., a circumferentially extending recess) can be made in the rotor frame and the banding sleeve can be disposed within. The banding sleeve may correspond in axial width and radial thickness to the dimensions of the recess. By using a lightweight material having a higher hoop stress resistance and a lower density for the banding sleeve, the mass of the rotor can be reduced without causing a detrimental effect to the structural integrity of the rotor and rotor frame.

The rotor may comprise more than one recess for the banding sleeve or sleeves. The banding sleeves may be of different radial thicknesses.

The circumferential portion of the rotor frame may be cantilevered from a radial portion of the rotor frame. As such the circumferential portion defines a supported end and a distal end. The supported end is proximate and joined to the radial portion of the rotor frame, and the distal end is at an opposite, unsupported end. The distal end is therefore unconstrained in the radial direction except for the constraint imparted by circumferential portion's own stiffness. As such the distal end will experience a higher deflection as the rotor rotates in comparison to the supported end. A higher circumferential and radial strain will therefore be generated in the region of the distal end compared to in the region of the supported end. Put another way, there will be more deflection of the rotor frame at the distal end of the circumferential portion compared to the region of the supported end of the circumferential portion.

The rotor frame of the rotor may be of a diameter equal to or greater than 200 mm, for example, 300 mm or greater, 400 mm or greater, or even 500 mm or greater.

As discussed, the power generated by the motor can be increased by using the outer rotor configuration because the magnets are spaced further from the centre of rotation and a greater torque results from the same rotational speed compared to an inner rotor motor. By increasing the size of the rotor frame, this effect can be accentuated to increase power output of the motor/generator further. Thus the size of the rotor may be greater than 200 mm so that it is suitable for use in aircraft applications. The electric motor/generator may be for powering an aircraft.

Due to difficulties and costs of producing larger components as compared to the additional benefits gained, and taking into account additional weight, the diameter of the rotor frame may be less than 1 m, for example, 750 mm or less for practical reasons.

For such applications where the electric motor/generator is powering an aircraft, a high power is required. The electric motor/generator may have a power of at least 100 kW. For example, the electric motor/generator may have a power of at least 150 kW, e.g., 200 kW or more, 300 kW or more, or even 400 kW or more. Optionally the electric motor/generator may have a power of at least 500 kW.

The banding sleeve may be disposed on the outer diameter of the circumferential portion of the rotor frame. By disposing the banding sleeve on the outer diameter of the circumferential portion, the banding sleeve can provide a resistance to the hoop stresses and in that way provide a constraint opposing the deflection caused in the rotor frame as the material of the circumferential portion tries to deflect outwardly during operation of the motor/generator.

The banding sleeve, or a further banding sleeve, may be disposed also on the inner diameter of the rotor frame, or within an internal position of the rotor frame so as to provide resistance against the hoop stress and deflection generated by the magnets (e.g., the deflection caused by the mass of the magnets under the centrifugal forces as well as by the attraction forces generated during use).

The banding sleeve may have a higher hoop stress resistance and a lower density than the corresponding material of the circumferential portion of the rotor frame. In order to be beneficial to the structural integrity of the rotor frame, the banding sleeve may reduce the passive mass of the rotor frame whilst maintaining its structural integrity.

The banding sleeve may be composed of a composite material. For example, the banding sleeve may be composed of bundles of fibres, particularly fibres laid in a hoop direction (circumferential direction), retained in a resin matrix. The composite material may comprise carbon fibres and a resin matrix. A tensile strength of a banding sleeve made from carbon fibre and resin matrix composite may exceed 2500 MPa, even 3000 MPa, and for example may be around 3500 MPa. This is substantially higher than the tensile strength of steel and other metals or alloys typically used for the rotor frame and will therefore have a higher hoop stress resistance and will aid in reducing the deflection of the rotor frame. Such a composite also has a lower density than the metal or alloys used to make the rotor frame and can, therefore, provide additional strength without increasing the passive mass as much as if additional support were provided through the thickening of the rotor frame. In fact, the tensile strength is such that the rotor frame can be made thinner when the banding sleeve is in place without being detrimental to the rotor frame's structural integrity. Coupled with the low density of the composite a mass saving can then be realised. The resin matrix of the composite material may be an epoxy resin matrix.

The rotor frame may be made of a suitable steel, or from a lighter weight alloy material and, for example, it may comprise aluminium and/or titanium. Aluminium has a lower density than other suitable metal materials, for example high strength steels, which are typically used to make the rotor frame; however aluminium can have a lower tensile strength and therefore a lower hoop stress resistance than such materials. For instance some high strength steels can have a tensile strength of around 420 MPa and a density of around 8.05 g/cm3 whereas aluminium can have a tensile strength of around 90 MPa and a density of around 2.7 g/cm3. The banding sleeve disposed on a circumferential portion of the rotor frame compensates for a lower tensile strength material like an aluminium alloy by imparting additional hoop stress resistance and hence allows the use of the low density aluminium to make the rotor frame without being detrimental to the structural integrity of the rotor frame. In this way the mass of the rotor frame can be reduced and the power density of the motor/generator can be increased as a result.

Similarly titanium and its alloys can be used for making the rotor frame in order to reduce the power density of the motor/generator. Titanium can have a tensile strength of around 240 MPa and a density of around 4.3 g/cm3. The banding sleeve is therefore also beneficial to compensate for the lower tensile strength and hoop stress resistance of titanium compared to steel, and weight savings can then be made by making the rotor frame, or at least parts of the rotor frame, from titanium. Titanium has a higher tensile strength than aluminium and may be used preferentially to aluminium for this reason. However, aluminium is cheaper and less dense than titanium and so it can also be beneficial to use aluminium over titanium, depending on the application of the motor/generator and the desired parameters to be optimised.

When choosing rotor frame materials, there are other factors to consider beyond weight and cost. For example, steel, while more dense than aluminium alloys, may offer lower coefficients of thermal expansion and higher stiffness than aluminium alloys. Also while steels and titanium alloys are generally comparable in strength, steel can offer greater stiffness and higher heat transfer coefficients than titanium alloys so may still be the material of choice.

The banding sleeve may be disposed in a recess in the circumferential portion of the rotor frame. By forming a recess in the rotor frame in which the banding sleeve is disposed, metal from the rotor frame can be removed. Thus when the mass of the banding sleeve is lower than the mass of the portion of rotor frame removed to form the recess, the passive mass of the rotor frame can be reduced.

The axial centreline of the banding sleeve may be disposed axially offset from the axial centreline of the circumferential portion of the rotor frame. That is to say, the axial centre lines of the circumferential portion of the rotor frame and the banding sleeve do not coincide. Due to the construction and configuration of the rotor frame the hoop stresses created in the rotor frame will vary depending on the position within the rotor frame. For example, if the circumferential portion of the rotor frame is cantilevered from a radial portion of the rotor frame, the distal (unsupported) end will experience greater deflection resulting from the centrifugal load due to the lack of radial constraint and so greater hoop stress will arise in the region of the distal end during use. As another example, greater internal stresses may occur where the circumferential portion of the rotor frame is joined to the radial portion, for example, at the attachment points in a rotor frame with a spoke design, between the radial portion and the circumferential portion of the rotor frame, as well as at points between the attachment points in the unsupported portions of the distal end during use.

The banding sleeve may be disposed closer to a distal end of the circumferential portion of the rotor frame than a supported end. To account for the greater deflection experienced by the distal end, the banding sleeve may be disposed so as to provide more support and strength to the distal end compared to the supported end.

The radial thickness of the banding sleeve may vary along an axial length of the banding sleeve and/or a circumference of the banding sleeve, in order to provide additional strength to regions where higher loads are generated during use. The variation in radial thickness may be due to increased volumes of fibres wound in the hoop direction, and the positions of these hoop windings may be tuned to where the highest hoop stresses are experienced to try minimise strain in a radial direction or at least improve the uniformity of such strains so that radial variations in the position of the magnets, during use, is minimised.

Thus the banding sleeve may be provided with regions having an increased radial thickness compared to other regions. These thickened regions will have greater strength and greater hoop stress resistance. The thickened regions thereby provide greater constraint against deflection to the rotor frame than the thinner regions of the banding sleeve. The distribution of the thickened portions of the banding sleeve may be arranged so that once the banding sleeve is positioned on the rotor frame the thickened portions reside where an increase in hoop stress is expected to be experienced in the rotor frame during use. As discussed, the deflection and hoop stress may increase towards the unsupported distal end of the circumferential portion of the rotor frame, therefore the banding sleeve may increase in thickness in the axial direction towards the distal end of the rotor frame.

In some rotor frame configurations the hoop stress may vary in the circumferential direction of the circumferential portion of the rotor frame, and so the thickness of the banding sleeve may be increased in the portions of the banding sleeve disposed in these regions.

The banding sleeve may be applied in order to achieve a substantially symmetrical deflection pattern about an axial centre line of the circumferential portion of the rotor frame when the rotor is in use. The banding sleeve may be positioned in such a way so as to provide additional strength and support to areas of the rotor frame that experience greater hoop stress during use (and resistance to stresses in other directions).

The banding sleeve may be designed so as to have greater strength in specific positions to coincide with regions of the rotor frame that experience greater hoop stress during operation of the motor/generator. The strength of the banding sleeve can be tailored by varying the thickness of the banding sleeve, an increased thickness having greater strength. When composed of a fibre composite material the strength of the banding sleeve may be tailored in additional ways, for example by varying the ratio of fibre to matrix and by varying the fibre alignment. Greater strength may be achieved by having a greater number of fibres wound in the circumferential direction, and by increasing the ratio of fibres to matrix. The position and design may be tailored so that the regions of increased hoop stress are compensated for by the banding sleeve resulting in a balanced deflection pattern of the rotor frame. This will eliminate stress concentration regions and the application of the banding sleeve can be focused on reducing the deflection where it is highest.

The majority of the fibres of the composite may be wound in a circumferential direction (hoop direction) of the banding sleeve. In some examples more than 80% of the fibres may be wound in the circumferential direction of the banding sleeve. In order to utilise the high tensile strength of the fibres along their length, the fibres are laid in the circumferential direction of the banding sleeve, for example, through winding. A banding sleeve with an increased proportion of fibres orientated with their highest tensile strength in the circumferential direction will have a higher hoop stress resistance.

Also disclosed is a method of increasing power density of an electric machine in the form of an electric motor/generator, the electric motor/generator comprising a stator and a rotor arranged radially outwardly of the stator, the rotor comprising a plurality of magnets arranged in an annular configuration surrounding the stator and supported by a rotor frame, the method comprising disposing a banding sleeve on a circumferential portion of the rotor frame radially outwardly of the plurality of magnets.

The banding sleeve may be provided in any suitable location of the circumferential portion. Providing the banding sleeve on an outer surface of the circumferential portion, however, may be easier to achieve in practice, e.g., by winding fibres of a composite material around the outer circumferential surface or sliding a preformed sleeve in place over the outer surface. Additionally or alternatively, the banding sleeve may be disposed in a recess in the circumferential portion of the rotor frame.

The banding sleeve may be made from a material selected to have a higher hoop stress resistance and a lower density than the circumferential portion of the rotor frame. Composite materials, in particular carbon fibre based composited materials are well suited for providing these properties.

Using composite materials, the banding sleeve may be formed easily in situ, for example, via filament winding, using the circumferential portion as a mandrel, and resin impregnation and curing. In other methods, the banding sleeve may be provided by strip of woven fibre fabric that is wound around the circumferential portion, which may have the resin pre-impregnated or be impregnated during the lay-up. The banding sleeve may also be preformed and then pressed in place on the circumferential portion of the rotor frame. For example, a tube of composite material may be pre-formed, sliced into suitable sized rings and fitted to the rotor frame.

In the proposed motor/generator, an outer rotor configuration may be employed. An embodiment of such an outer rotor configuration will be discussed in greater detail below by way of example.

FIG. 1 shows an exemplary motor 50 in the form of an outer rotor motor. The motor 50 includes a stator 60 and a rotor 90. The rotor frame 100 includes a plurality of magnets (not visible in FIG. 1) that are arranged to form an annular ring surrounding the stator. The rotor frame 100 is cantilevered at one axial end from a hub 150.

Figure 2:
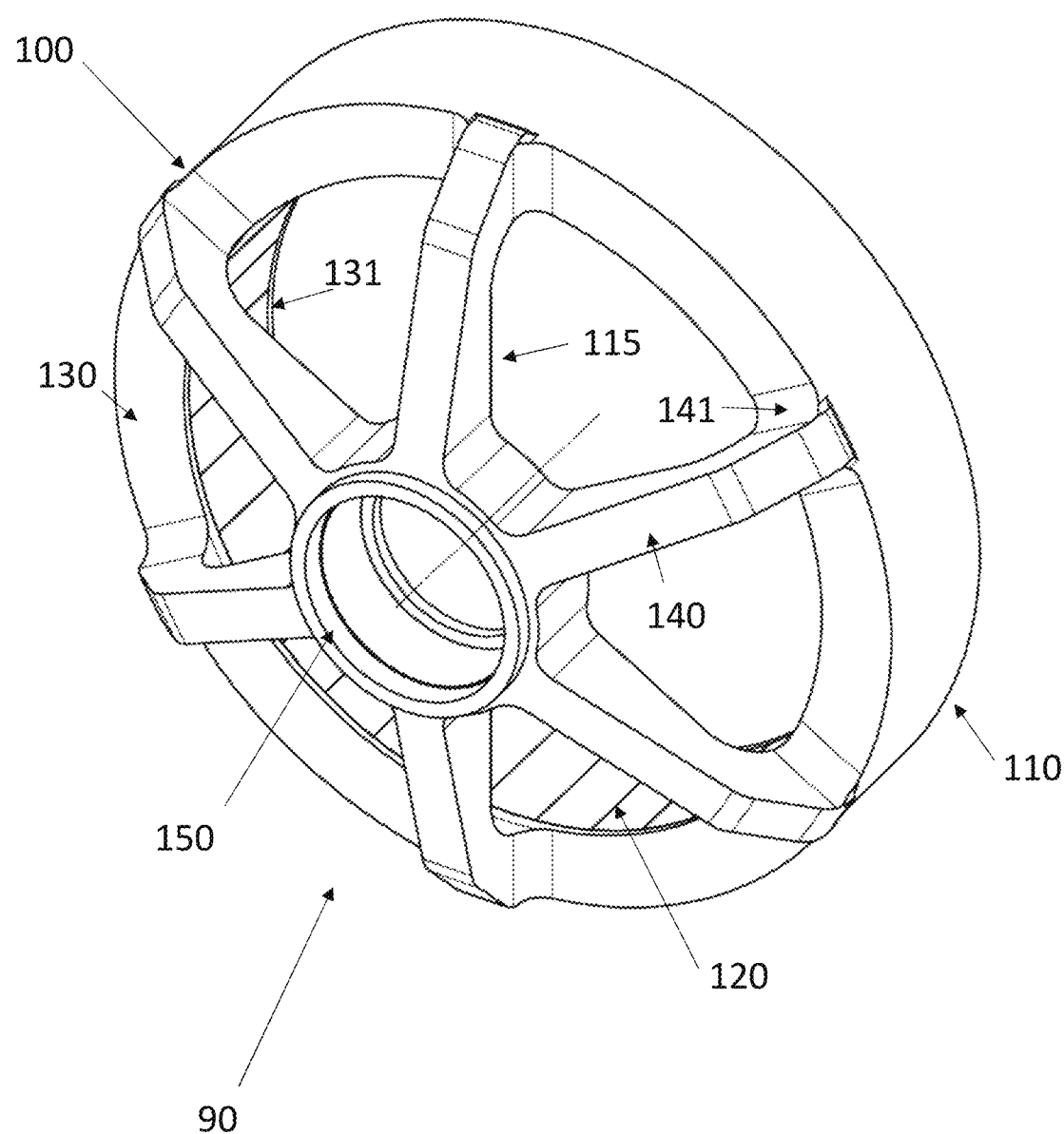
FIG. 2 illustrates a perspective view of an exemplary rotor frame without the banding sleeve.

In FIG. 2 there is shown an exemplary rotor 90 comprising a rotor frame 100. The rotor frame 100 has a cantilevered, outer rotor configuration. The rotor frame 100 is illustrated without the addition of the banding sleeve in this figure. A circumferential portion 110 of the rotor frame 100 extends in a circumferential and axial direction so as to extend around and over an annular ring of magnets 120 supported by the rotor frame 100. The circumferential portion 110 of the rotor frame 100 is joined to a radial portion 115 which, in the illustration, comprises a hub 150 and spokes 140 extending in the radial direction from the hub 150 at the centre of the rotor towards the circumferential portion 110 of the rotor frame 100.

The circumferential portion 110 additionally comprises circumferentially extending flanges 130, 131 disposed at either end of the circumferential portion 110. There is hence an inner flange 130 and an outer flange 131. This construction is used to secure the magnets 120 to the frame 100, the magnets typically having a generally rectangular or other suitable form extending axially and circumferentially, seated in a side-by-side relationship against an inner surface of the circumferential portion and extending from the inner flange 130 to the outer flange 131. The inner and outer flanges 130, 131 also provide rigidity to the circumferential portion 110 to resist deflection during use.

In the exemplary arrangement, the circumferential portion 110 is supported by spokes 140 extending in the radial direction from a hub 150, which may be in the form of an inner core/shaft/cylinder/ring, to the circumferential portion 110. The spokes 140 attach to the circumferential portion 110 at attachment points 141 located at regular intervals on the inner plate 130.

Other rotor frame configurations are also envisaged. For example, the radial portion 115 may take the form of a circular plate or cone, or other radially extending surface that is able to support the circumferential portion 110. The number and arrangement of spokes 140 may also be different to that shown. The outer rotor frame may also not be cantilevered and instead the circumferential portion may engage a race or be supported in some other way at its other end.

Figure 3:
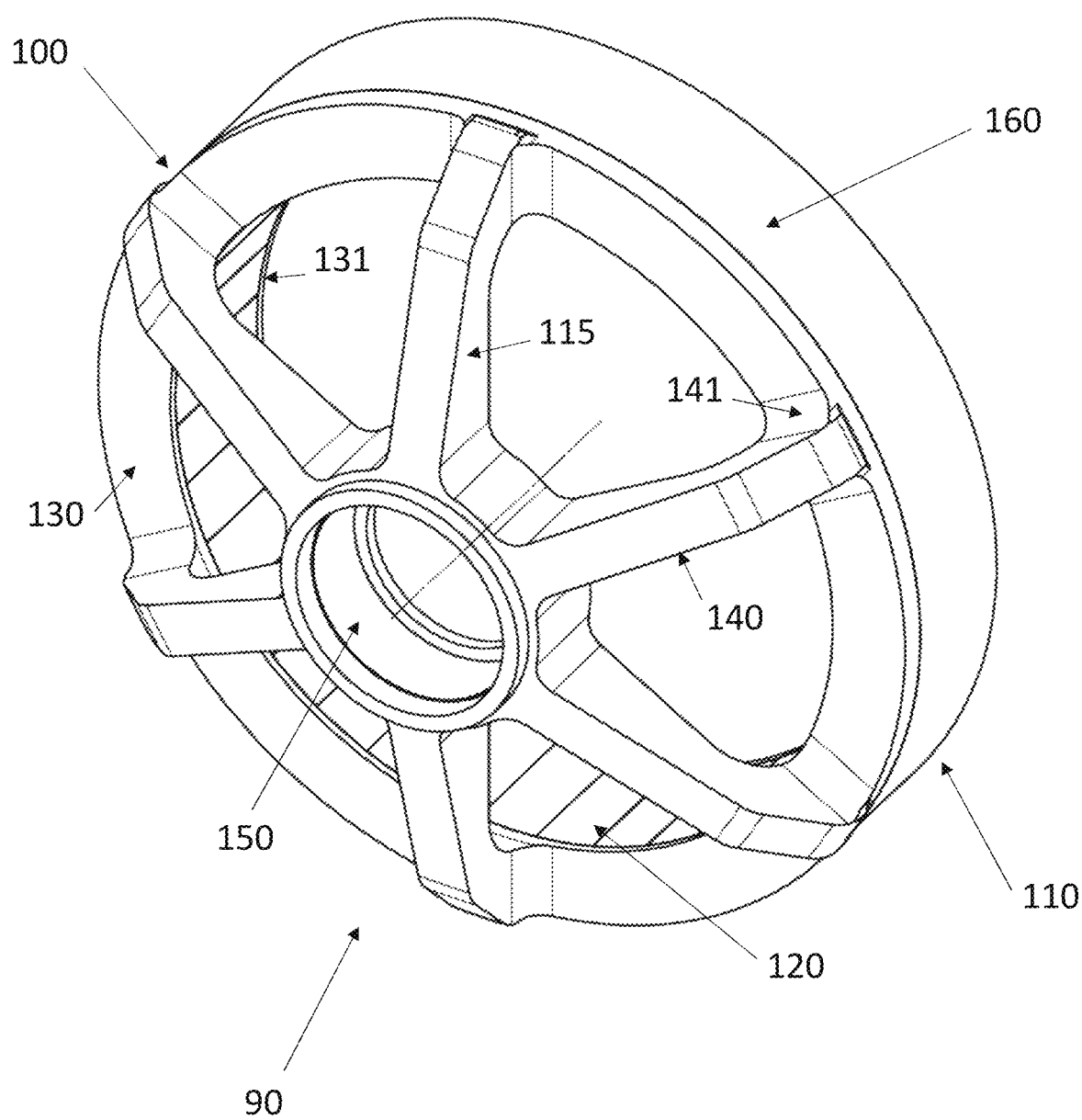
FIG. 3 illustrates a perspective view of an exemplary rotor frame with a banding sleeve provided on an outer surface of a circumferential portion of the rotor frame.

FIG. 3 shows the rotor frame 100 with the banding sleeve 160 disposed on the outer diameter of the circumferential portion 110 of the rotor frame 100. The rotor frame 100 comprises substantially the same construction and format as the rotor frame 100 in FIG. 2 other than a banding sleeve 160 is provided in a recess 170 in an outer surface of the circumferential portion 110 of the rotor frame 100. The features mentioned above in relation to FIG. 2 therefore apply equally to the rotor frame 100 of FIG. 3.

Figure 4:
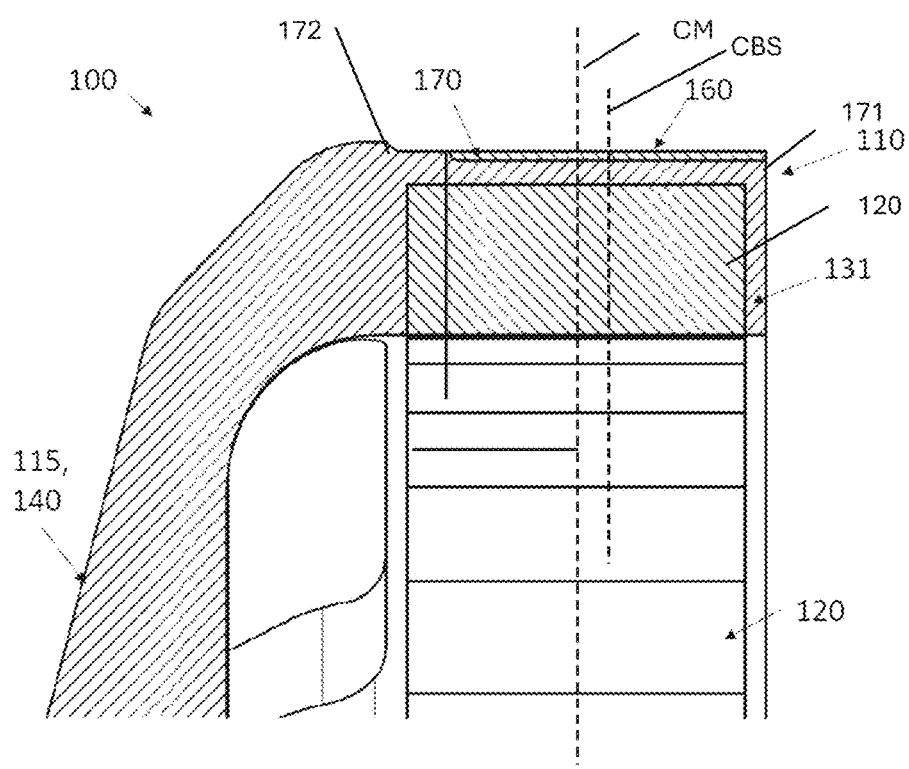
FIG. 4 is a circumferential cross section of an exemplary rotor frame and banding sleeve.

FIG. 4 shows a circumferential cross section of an enlargement of the rotor frame 100 with the banding sleeve 160 disposed in a recess 170 in the outer surface (outer diameter) of the circumferential portion 110 of the rotor frame 100. As shown in FIG. 4, the rotor frame 100 supports magnets 120 by providing seats along the rotor frame's inner surface (inner diameter) in which the magnets are fixed and bounded by the flanges 130 and 132 of the rotor frame 100.

In the embodiment of FIG. 4, the banding sleeve 160 is disposed axially offset from the axial centre line of the circumferential portion 110. The axial centreline (CBS) of the banding sleeve 160 may be disposed axially offset from the axial centreline of the circumferential portion of the rotor frame. That is to say, the axial centre lines of the circumferential portion of the rotor frame and the banding sleeve do not coincide. Accordingly, the banding sleeve 160 is also axially offset from the axial centre line (CM) of the magnets 120. Put another way, the banding sleeve 160 and the recess 170 in which the banding sleeve 160 is disposed does not extend along the entire axial length of the circumferentially extending part of the circumferential portion 110. Instead the recess 170 and the banding sleeve 160 extend to the outer, unsupported edge/distal end 171 of the circumferential portion 110. The banding sleeve 160 may be disposed closer to the distal end 171 of the circumferential portion 110 of the rotor frame than a supported end 172.

Figure 5A:
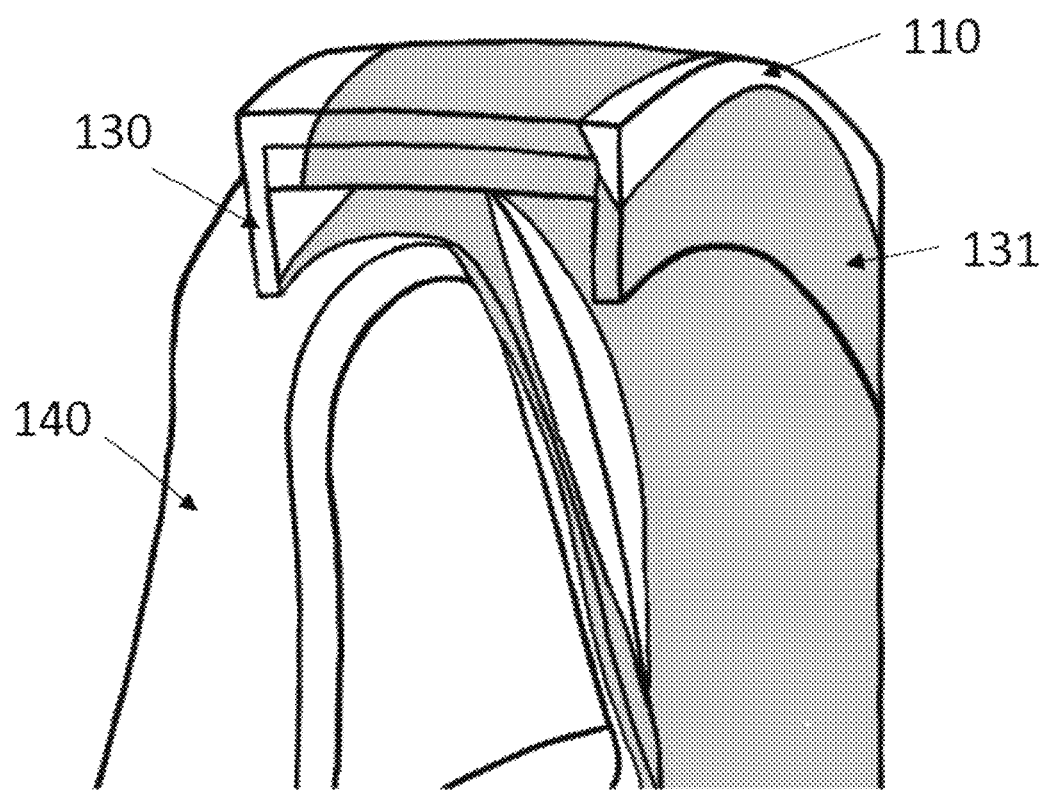
FIG. 5a is a schematic depicting a pattern of highest deflection in a rotor frame for an outer rotor motor in which a banding sleeve is not present.

FIG. 5a shows a rotor frame for an outer rotor motor composed of steel and without a banding sleeve with a highest band of deflection mapped on to the shape. The areas in grey shading show the pattern of the highest deflection in the rotor frame 100. It can be seen that the highest deflection occurs in the central section of the circumferential portion 110 and displaced slightly to the outer side, as well as along the radially inner portion of the outer flange 131 and the regions on the inner flange 130 where the spokes 140 are attached.

Figure 5B:
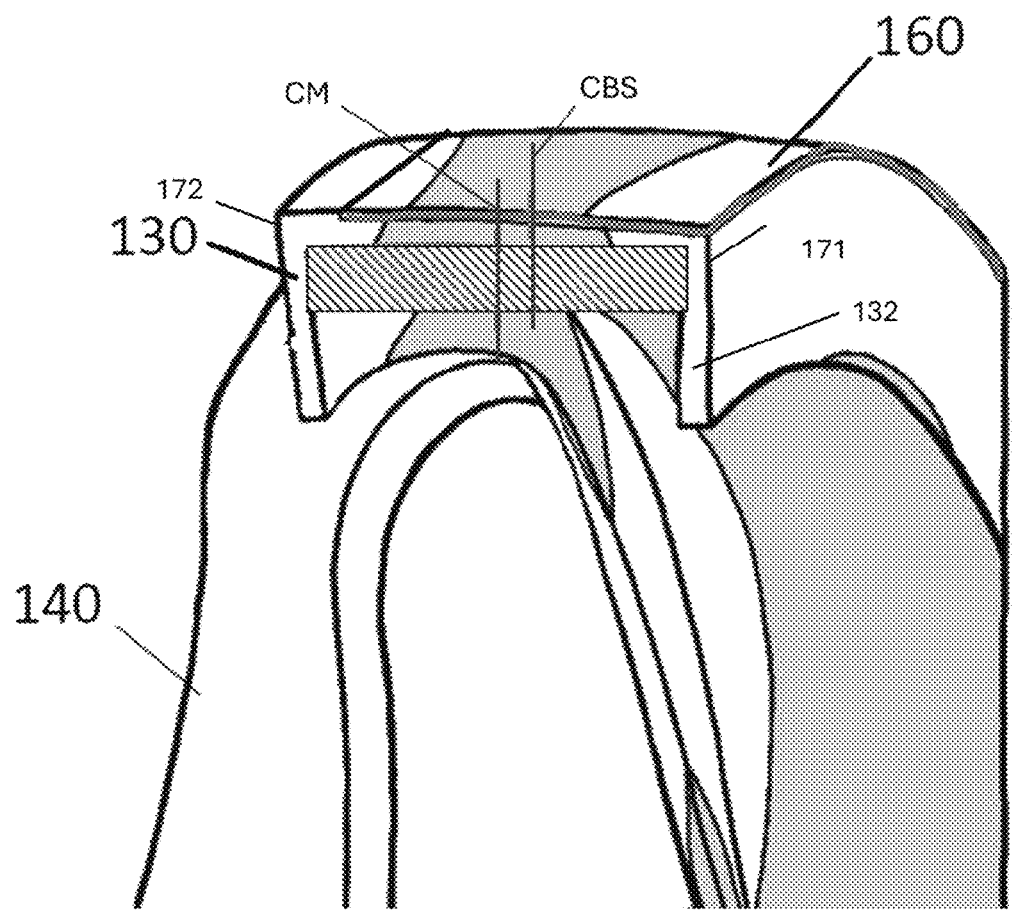
FIG. 5b is a schematic depicting a pattern for highest deflection in an exemplary rotor frame for an outer rotor motor in which a banding sleeve is present.

FIG. 5b shows a map of the highest band of deflection in the proposed rotor frame 100 comprising a banding sleeve 160 disposed on the outer diameter of the circumferential portion 110 of the rotor frame 100. It can be seen that the extent of the deflection has been reduced. In particular the region of the circumferential portion 110 suffering the highest deflection is small compared to that when no banding sleeve 160 is used, and the deflection of the outer flange 131 is greatly reduced so that only the extremities of the unsupported end of the outer flange experiences the highest deflection. The amount of deflection for this band of highest deflection in FIG. 5b is also around 2% lower than that for the highest band of deflection for the rotor frame 100 shown in FIG. 5a.

In one example of a cantilevered, steel rotor frame, providing a recess 170 and fitting a carbon fibre banding sleeve 160 to the rotor frame 100 was found to reduce a passive rotor structure mass of 18.3 kg to a passive mass of 16.9 kg. At the same time, the modification was found to reduce the deflection suffered by the rotor frame 100. In another example, an aluminium alloy rotor frame was provided with a carbon composite banding sleeve. The composite banding sleeve 160 was found to retain the aluminium alloy rotor frame 100 under the centrifugal loads as found with the steel rotor frame, and further resist thermal expansion of the aluminium alloy and thereby retain a correct air gap between the rotor frame 100 and the stator 60.

While the provision of the banding sleeve has significant impact on an outer rotor motor design, the same principles can be applied to an outer rotor element of a double rotor machine design.

What is claimed is:

1. An electric motor/generator comprising:
a stator;
a rotor, comprising a plurality of magnets and a rotor frame arranged to support the plurality of magnets in an outer rotor configuration so that the plurality of magnets are arranged to form an annular ring surrounding the stator; and
a banding sleeve disposed on a circumferential portion of the rotor frame radially outwardly of the plurality of magnets;
wherein an axial centreline of the banding sleeve is axially offset from the axial centreline of the plurality of magnets and closer to a distal end of the circumferential portion of the rotor frame than to a supported end of the circumferential portion.

2. An electric motor/generator as claimed in claim 1, wherein the banding sleeve has a higher hoop stress resistance and/or a lower density than the circumferential portion of the rotor frame.

3. An electric motor/generator as claimed in claim 1, wherein the banding sleeve is composed of a composite material.

4. An electric motor/generator as claimed in claim 3, comprising continuous fibres laid to extend in at least a hoop direction of the banding sleeve.

5. An electric motor/generator as claimed in claim 3, wherein the composite material comprises carbon fibres and a resin matrix.

6. An electric motor/generator as claimed in claim 1, wherein the banding sleeve is disposed on the outer diameter of the circumferential portion of the rotor frame, optionally wherein the banding sleeve is disposed in a recess in the circumferential portion of the rotor frame.

7. An electric motor/generator as claimed in claim 1, wherein the circumferential portion of the rotor frame is cantilevered from a radial portion of the rotor frame, the circumferential portion hence defining a supported end and a distal end.

8. An electric motor/generator as claimed in claim 1, wherein the rotor frame comprises aluminium and/or titanium based materials.

9. An electric motor/generator as claimed in claim 1, wherein the radial thickness of the banding sleeve varies along an axial length of the banding sleeve and a circumference of the banding sleeve, in order to provide additional strength to regions where higher loads are generated during use.

10. An electric motor/generator as claimed in claim 1, wherein the banding sleeve is applied in order to achieve a substantially symmetrical deflection pattern about an axial centre line of the circumferential portion of the rotor frame when the rotor is in use.

11. An electric motor/generator as claimed in claim 1, wherein a majority of the fibres of the composite are wound in a circumferential direction of the banding sleeve.

12. An electric motor/generator as claimed in claim 11, wherein more than 80% of the fibres are wound in the circumferential direction of the banding sleeve.

13. An electric motor/generator as claimed in claim 1, wherein the electric motor/generator is for powering an aircraft and a diameter of the rotor frame of the rotor is equal to or greater than 200 mm.

14. A method of increasing power density of an electric motor/generator, the electric motor/generator comprising a stator and a rotor arranged radially outwardly of the stator, the rotor comprising a plurality of magnets arranged in an annular configuration surrounding the stator and supported by a rotor frame, the method comprising:
    disposing a banding sleeve on a circumferential portion of the rotor frame radially outwardly of the plurality of magnets such that a centreline of the banding sleeve is closer to a distal end of the rotor than to a supported end of the rotor.

15. A method as claimed in claim 14, wherein the banding sleeve is made from a material selected to have a higher hoop stress resistance or a lower density than the circumferential portion of the rotor frame.

16. A method as claimed in claim 15, wherein the banding sleeve is disposed in a recess in the circumferential portion of the rotor frame.

17. A method as claimed in claim 14, wherein the banding sleeve is formed in situ via filament winding and resin impregnation and curing, or the banding sleeve is preformed and then pressed in place on the circumferential portion of the rotor frame.

18. An electric motor/generator as claimed in claim 1, wherein the banding sleeve extends to a distal end of the circumferential portion.

19. An electric motor/generator comprising:
    a stator;
    a rotor, comprising a plurality of magnets and a rotor frame arranged to support the plurality of magnets in an outer rotor configuration so that the plurality of magnets are arranged to form an annular ring surrounding the stator; and
    a banding sleeve disposed on a circumferential portion of the rotor frame radially outwardly of the plurality of magnets, wherein a centreline of the banding sleeve is closer to a distal end of the rotor than to a supported end of the rotor,
    wherein the banding sleeve is disposed in a recess in the outer diameter of the circumferential portion of the rotor frame.

20. An electric motor/generator as claimed in claim 19, wherein the recess and the banding sleeve extend to a distal end of the circumferential portion.

* * * * *